US006430654B1

(12) United States Patent
Mehrotra et al.

(10) Patent No.: US 6,430,654 B1
(45) Date of Patent: *Aug. 6, 2002

(54) APPARATUS AND METHOD FOR DISTRIBUTED NON-BLOCKING MULTI-LEVEL CACHE

(75) Inventors: Sharad Mehrotra, Cupertino; Ricky C. Hetherington, Pleasanton, both of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,072

(22) Filed: Jan. 21, 1998

(51) Int. Cl.[7] .............................................. G06F 12/08
(52) U.S. Cl. ......................... 711/118; 711/119; 711/122
(58) Field of Search ................................ 711/119, 121, 711/122, 123, 130, 118

(56) References Cited

U.S. PATENT DOCUMENTS

| 5,555,392 | A | * | 9/1996 | Chaput et al. ............... 711/118 |
| 5,623,628 | A | * | 4/1997 | Brayton et al. ............. 711/119 |
| 5,642,494 | A | * | 6/1997 | Wang et al. ................. 711/140 |
| 5,764,934 | A | * | 6/1998 | Fisch et al. ................. 710/129 |
| 5,787,469 | A | * | 7/1998 | Merrell ....................... 711/119 |
| 5,809,530 | A | * | 9/1998 | Samra et al. ............... 711/119 |
| 6,128,677 | A | * | 10/2000 | Miller et al. .................. 710/40 |

OTHER PUBLICATIONS

Halfhill, T., Intel's P6, [Online] http://www.byte.com/art/9504/sec7/art1.htm, Apr. 1995.*
How the P6 Works, [Online] http://x86.ddj.com/intel.doc/686manuals.htm, 1995.*
Colwell et al., A 0.6 $\mu m$ BiCMOS Processor with Dynamic Execution, [Online] http://x86.ddj.com/intel.doc/686manuals.htm, 1995.*
Gwennap, L. "Digital 21264 Sets New Standard", Microprocessor Report, Oct. 1996, [Online] http://www.mdronline.com/q/169   19840658btywqq/mpr/articles/21264/21264.html.*
Ahi et al., "R1000 Superscalar Microprocessor", Hot Chips VII (95), [Online] ftp://sgigate.sgi.com/pub/doc/R1000/hotchips/hochips.ps, 1995.*
R1000 Superscalar Microprocessor talk, Hot Chips VII (95), [Online] ftp://sgigate.sgi.com/pub/doc/R1000/hotchips/hochips_text_A4.ps, 1995.*
Profiler of Nitin Sarangdhar, [Online] Available: http://www.nital.com/nitincv.htm, date unknown.*
Sarangdhar et al. An Overview of the Pentium® Pro Processor Bus. COMPCON 1996: 383–387.*

* cited by examiner

Primary Examiner—Do Hyun Yoo
Assistant Examiner—Yamir Encarnacion
(74) Attorney, Agent, or Firm—Gunnison, McKay & Hodgson, L.L.P.; Philip J. McKay

(57) ABSTRACT

A multi-level cache and method for operation therefore includes a first non-blocking cache receiving access requests from a device in a processor, and a first miss queue storing entries corresponding to access requests not serviced by the first non-blocking cache. A second non-blocking cache is provided for receiving access requests from the first miss queue, and a second miss queue is provided for storing entries corresponding to access requests not serviced by the second non-blocking cache. Other queueing structures such as a victim queue and a write queue are provided depending on the particular structure of the cache level within the multilevel cache hierarchy.

21 Claims, 14 Drawing Sheets

CACHE ACCESS REQUEST TYPES

| I$ | D$ | L2$ | L3$ |
|---|---|---|---|
| P_rd | P_rd | P_rd | — |
| P_wr | P_wr | P_wr | — |
| MQ_rd | MQ_rd | MQ_rd_I$ | MQ_rd |
| MQ_wr | MQ_wr | MQ_wr_I$ | MQ_wr |
| SNOOP | SNOOP | MQ_rd_D$ | — |
|  |  | MQ_wr_D$ | — |
|  |  | VQ_rd | VQ_rd |
|  |  | VQ_wr | VQ_wr |
|  |  | WQ_wr | WQ_wr |
|  |  | SNOOP | SNOOP |

NORMAL OPERATION PRIORITIES

SNOOP >

STALL CONDITION HANDLING

- STOP ACCEPTING P_rd OR P_wr

- BOOST PRIORITY OF VQ_rd, WQ_wr, VQ_wr

- LOWER PRICRITY OF MQ_rd, P_rd, P_wr

FIG. 10B

APPARATUS AND METHOD FOR DISTRIBUTED NON-BLOCKING MULTI-LEVEL CACHE

CROSS-REFERENCES TO RELATED APPLICATIONS

The subject matter of the present application is related to that of U.S. Pat. application: Ser. No. 09/009,814 identified for "Apparatus and Method for Handling Multiple Mergeable Misses in a Non-Blocking Cache" filed concurrently herewith by Mehrotra, et al, now U.S. Pat. No. 6,145,054; Ser. No. 09/009,954 identified for "Apparatus and Method for Detection and Recovery from Structural Stalls in a Multi-Level Non-Blocking Cache System" filed concurrently herewith by Mehrotra, et al, now U.S. Pat. No. 6,148,372, Ser. No. 09/009,815 identified for "Apparatus and Method for Interlocked Cache Controller Transaction Handshakes for Queuing Structures in a Multi-Level Non-Blocking Cache Subsystem" filed concurrently herewith by Mehrotra, now U.S. Pat. No. 6,226,713, the disclosures of which are herein incorporated by this reference.

BACKGROUND OF THE INVENTION

1. Field of the Invention

This invention relates in general to cache memory, and more particularly, to hierarchical cache memory designs using multiple levels of non-blocking caches having distributed control in a microprocessor.

2. Relevant Background

The ability of modern processors, also called microprocessors, to execute instructions has typically outpaced the ability of memory subsystems to supply instructions and data to the processors. To improve overall performance, processors use techniques including pipelining, superscalar execution, speculative instruction execution, and out-of-order instruction issue to enable multiple instructions to be issued and executed each clock cycle. As used herein the term processor includes complex instruction set computers (CISC), reduced instruction set computers (RISC), and hybrids thereof.

The ability of processors to execute instructions has typically outpaced the ability of memory subsystems to supply instructions and data to the processors, however. Most processors use a cache memory system to speed memory access.

Cache memory comprises one or more levels of dedicated high-speed memory holding recently accessed data, designed to speed up subsequent access to the same data. Cache technology is based on the premise that programs frequently re-execute the same instructions. When data is read from main memory, a copy is also saved in the cache, along with an index to the associated main memory. The cache then monitors subsequent requests for data to see if the information needed has already been stored in the cache. If the data had indeed been stored in the cache (i.e., a "hit"), the data is delivered immediately to the processor and the attempt to fetch the information from main memory is aborted (or not started). If, on the other hand, the data had not been previously stored in cache (i.e., a "miss") then it is fetched directly from main memory and also saved in the cache for future access.

Typically, processors support multiple cache levels, most often two or three levels of cache. A level 1 cache (L1 cache or L1$) is usually an internal cache built onto the same monolithic integrated circuit (IC) as the processor itself. On-chip cache is the fastest (i.e., lowest latency) because it is accessed by the internal components of the processor. On the other hand, off-chip cache is an external cache of static random access memory (SRAM) chips plugged into a motherboard. Off-chip cache has much higher latency, although it is typically much shorter latency than accesses to main memory.

Given the size and access time disparity between main system memory (which may, for example, be hundreds of thousands of megabytes) and cache memory (which can be, for example, a few megabytes), certain rules are used to determine how to copy data from main memory to cache as well as how to make room for new data when a cache is full. In a direct mapped cache, the cache location for a given memory address is determined from the middle address bits. In other words, each main memory address maps to a unique location in the cache. Hence, a number of different memory addresses will map to the same cache location. In a fully associative cache, data from any main memory address can be stored in any cache location. Each cache line is indexed by a "tag store" that holds a "tag" generated, for example, by hashing the memory address that it indexes. All tags are compared simultaneously (i.e., associatively) with a requested address, and if one tag matches, then its associated data is accessed. This requires an associative memory to hold the tags that makes this form of cache expensive.

Set associative cache is essentially a compromise between direct mapped cache and a fully associative cache. In a set associative cache, each memory address is mapped to a certain set of cache locations. An N-way set associative cache allows each address to map to N cache locations (for example, four-way set associative allows each address to map four different cache locations). In other words, in a four-way set associative cache, each tag maps to four possible cache locations in a set. Upper address bits in the requested address will uniquely identify which item in the set the tag is referencing.

Superscalar processors achieve higher performance by executing many instructions simultaneously. These instructions generate multiple numbers of memory loads or stores per cycle. Conventional processors use several techniques to allow coherent and parallel access to the cache and memory hierarchy. One technique, used commonly at the lowest level of cache access, provides duplicate copies of the cache. Each cache copy doubles the chip area consumed as compared to a single cache copy. Increased size also tends to limit clock speeds, so this technique is limited to small caches and typically enables only two cache copies and two accesses per cycle.

Another technique involves using high speed circuitry to allow two or more accesses per processor clock cycle. This approach assumes that the processor clock is sufficiently slow that the cache clock can be increased. In practice, however, the processor performance demands force the processor clock to be increased such that the ratio of processor clock to cache clock fails to allow significant advantage to this technique.

A similar technique is to provide multiple banks with each bank serving a particular set of main memory addresses. While this technique is adaptable to larger cache sizes, it too has limited scalability. Multi-bank caches, like duplicate caches, tend to limit clock speeds. Multiple banks are successfully used to enable multiple accesses per clock cycle, but have performance limits caused by address conflicts. Address conflicts arise when two cache accesses are attempting to access the same bank.

In a pipelined hierarchical cache system that generates multiple cache accesses per clock cycle, coordinating data traffic between the different cache levels is problematic. For example, when a first access to a given cache line results in a miss, the access is sent on to be serviced by a higher cache level or main memory. When the first access is completed, the cache line becomes valid. In typical cache organizations, after the cache line becomes valid, it is forwarded to a lower cache level or device that generated the original access. The cache line fill operation needs to be synchronized with the return data, but the lower level cache executing the line fill operation cannot predict when the required data will be returned.

"Blocking" cache designs prohibit or "block" cache activity until a miss has been serviced by a higher cache level or main memory, and the line fill operation is completed. In this case, subsequent cache accesses are stalled until the first missed access is complete. One drawback of a blocking cache is that the memory pipeline will be stalled while the cache miss is serviced, slowing memory access and reducing overall processor performance.

On the other hand, when one or more levels of the cache memory subsystem are "non-blocking", each cache level is unaware of the results of the accesses (i.e., hit or miss) at the next higher level of the hierarchy. In a non-blocking cache, a cache miss generates a line fill operation that will eventually be serviced, however, the cache continues to allow access requests from lower cache levels or functional units in a processor.

In the prior art, a first miss to a cache can force the processor to wait until the miss has been completely serviced. In a heavily pipelined, superscalar issue processor having multiple functional units executing several instructions per cycle, it is possible to have multiple instructions in flight in the machine at any time. Typically, approximately 35% of all operations in a modern computer are memory operations. It is possible that several of these memory operations may have produced cache misses, thereby saturating the resources within the cache memory subsystem. Therefore, handling overflow conditions within a multi-level, non-blocking cache hierarchy can be problematic.

What is needed is an architecture and a method for operating a hierarchical non-blocking cache memory subsystem which is compatible with high speed instruction processing and memory access.

SUMMARY OF THE INVENTION

In light of the above, therefore, according to a broad aspect of the invention, a multi-level cache and method for operation of a multi-level cache generating multiple cache system accesses simultaneously is provided. The cache unit includes a first non-blocking cache receiving access requests from a device in a processor, and a first miss queue storing entries corresponding to access requests not serviced by the first non-blocking cache. A second non-blocking cache is provided for receiving access requests from the first miss queue, and a second miss queue is provided for storing entries corresponding to access requests not serviced by the second non-blocking cache. Other queueing structures such as a victim queue and a write queue are provided depending on the particular structure of the cache level within the multilevel cache hierarchy.

In another broad aspect of the invention, a processor that executes coded instructions is disclosed including an instruction scheduling unit receiving the coded instructions and issuing the received instructions for execution. An instruction execution unit generates accesses in response to the issued instructions. A first non-blocking cache receives access requests from a device in a processor, and a first miss queue stores entries corresponding to access requests not serviced by the first non-blocking cache. A second non-blocking cache is provided for receiving access requests from the first miss queue, and a second miss queue is provided for storing entries corresponding to access requests not serviced by the second non-blocking cache.

A computer system incorporating the features of the present invention is also disclosed.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 10A illustrates a hierarchy of priorities for servicing cache access requests during normal mode of operation of the cache memory subsystem in accordance with one embodiment of the present invention.

FIG. 10B lists actions performed during stall condition operation of the cache memory subsystem in accordance with one embodiment of the present invention.

DETAILED DESCRIPTION OF THE PREFERRED EMBODIMENTS

The present invention involves a method and apparatus for a non-blocking hierarchical cache distributed over multiple levels. The present invention is illustrated with a three-level cache memory subsystem, however, it is contemplated that any number of cache levels may be implemented and can make use of the present invention.

Figure 1:
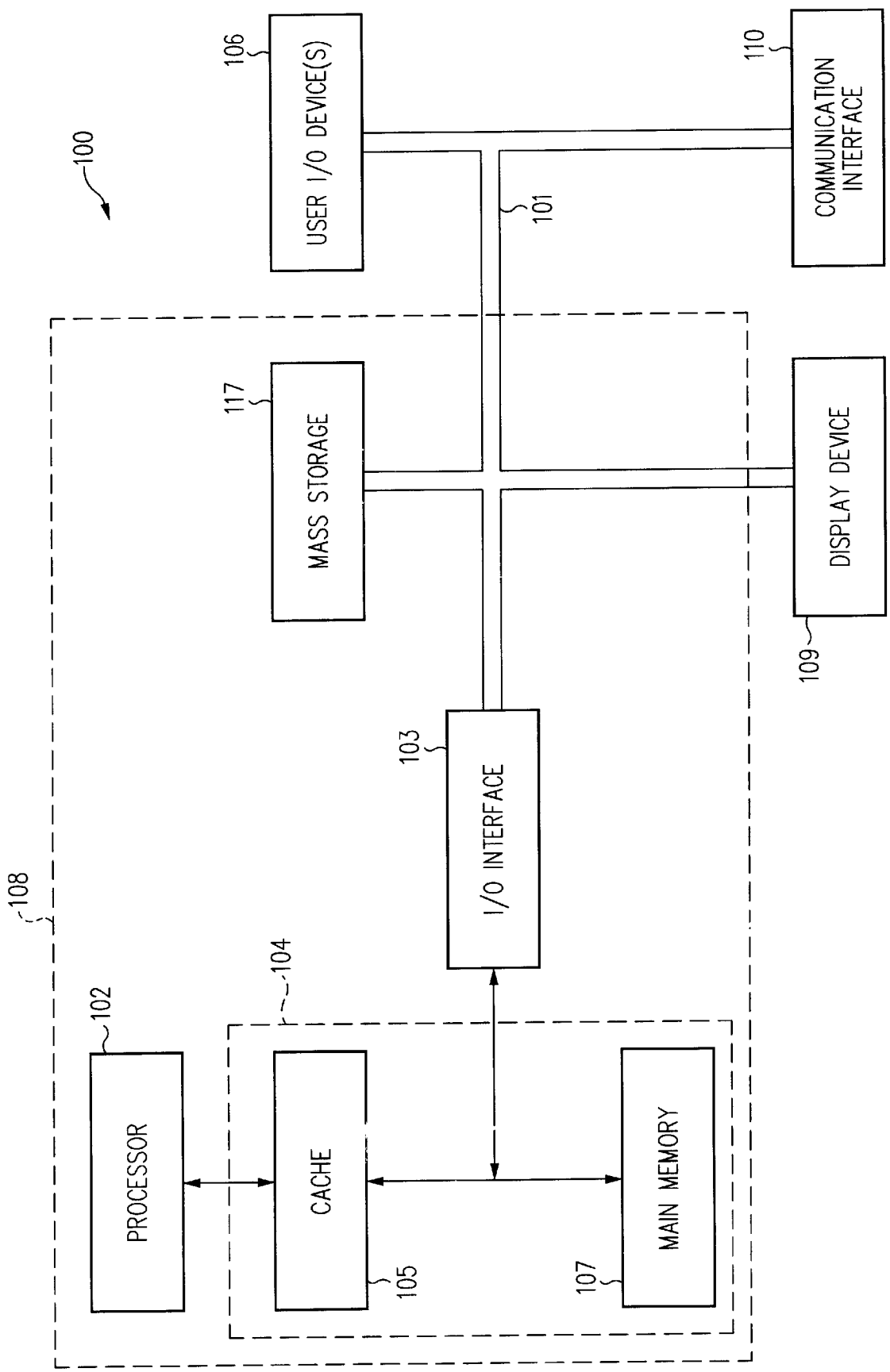
FIG. 1 shows in block diagram form a computer system in accordance with one embodiment of the present invention.

Processor architectures can be represented as a collection of interacting functional units as shown in FIG. 1. These functional units, discussed in greater detail below, perform the functions of fetching instructions and data from memory, decoding fetched instructions, scheduling instructions to be executed, executing the instructions, managing memory transactions, and interfacing with external circuitry and devices.

Figure 2:
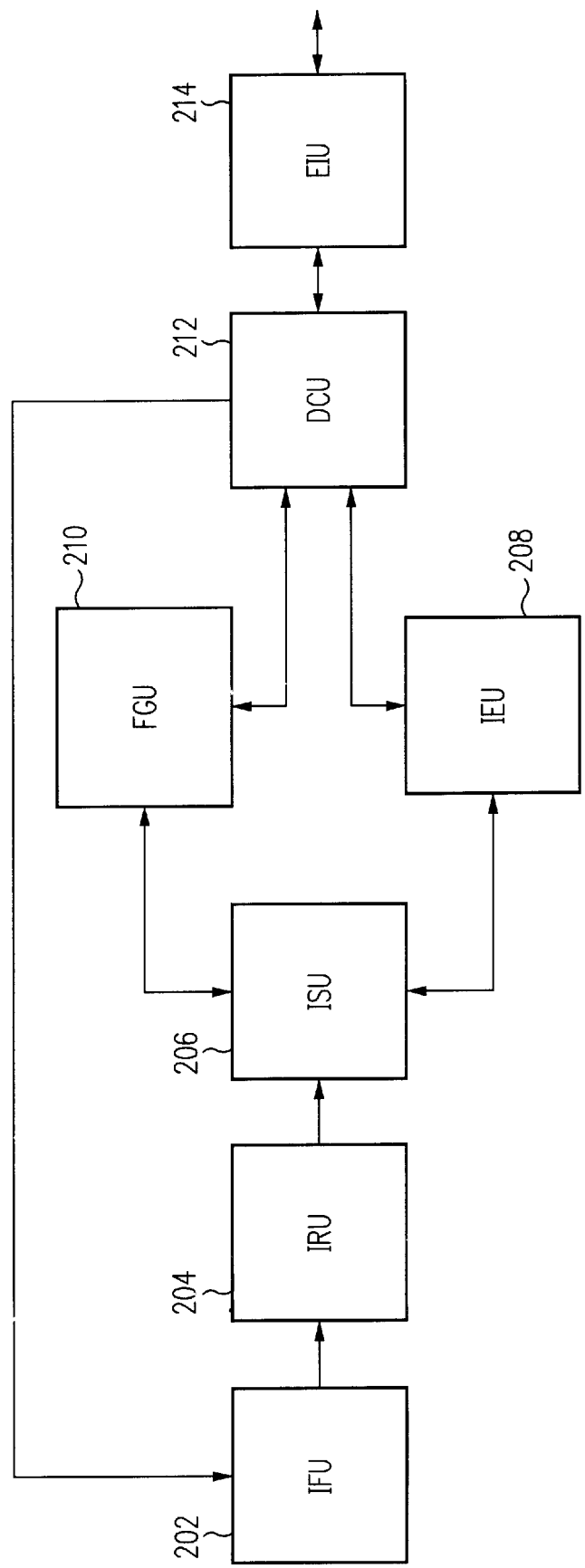
FIG. 2 shows a processor in block diagram form in accordance with one embodiment of the present invention.

The present invention is described in terms of apparatus and methods particularly useful in a highly pipelined and superscalar processor 102 shown in block diagram form in FIG. 1 and FIG. 2. The particular examples represent implementations that can be used to issue and execute multiple instructions per cycle (IPC) and are amenable to high clock frequency operations. However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) interface 103 for processing data and executing instructions, and memory system 104 coupled with bus 101 for storing information and instructions for processor 102. Memory system 104 comprises, for example, cache memory 105 and main memory 107. As will be described below, cache memory 105 includes one or more levels of cache memory. In a typical embodiment, processor 102, I/O interface 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available devices, including another computer. Mass storage device 117 is coupled to bus 101, and may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein.

Some or all of mass storage 117 may be configured to be incorporated as a part of memory system 104.

In a typical computer system 100, processor 102, I/O interface 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache (I$) is commonly referred to as a portion of the level one cache (L1$), with another portion of the L1 cache dedicated to data storage (D$). IFU 202 fetches one or more instructions at a time by appropriately addressing the instruction cache. The instruction cache feeds addressed instructions to instruction rename unit (IRU) 204. Preferably, IFU 202 fetches multiple instructions each cycle, and in a specific example fetches eight instructions each cycle.

In the absence of a conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to minimize dependencies. IRU 204 further comprises dependency checking mechanisms that analyze the instructions fetched by IFU 202 amongst themselves, and against those instructions installed in ISU 206, to establish true dependencies. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (e.g., registers). Complex instructions include any instructions that require more than the limited number of resources or involve more than the limited number of dependencies. IRU 204 includes mechanisms to translate or expand complex instructions into a plurality of microinstructions. These microinstructions are executed more efficiently in the execution units (e.g., floating point and graphics execution unit (FGU) 210 and integer execution unit (IEU) 208), than could the macroinstructions.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction issue logic is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch path and initiates IFU 202 to fetch from the correct branch address. An instruction is retired when it has finished execution and all older instructions have retired. Upon retirement the instruction's result is written into the appropriate register file and it is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions concurrently in execution on the processor pipelines. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphics instructions. FGU 210 functions to perform final decoding of floating point instructions before they are executed on the execution units and to determine operand bypassing amongst instructions concurrently in execution on the processor pipelines. In the specific example, FGU 210 includes one or more pipelines dedicated to implementing special purpose multimedia and graphics instructions that are extensions to standard architectural instructions for a processor. FGU 210 may be equivalently substituted with a floating point unit (FPU) in designs in which special purpose graphics and multimedia instructions are not used. FGU 210 preferably includes mechanisms to access single and/or double precision architectural registers as well as single and/or double precision rename registers.

A data cache memory unit (DCU) 212 shown in FIG. 2, including cache memory 105 shown in FIG. 1, functions to buffer memory reads from off-chip memory through external interface unit (EIU) 214. Optionally, DCU 212 also buffers memory write transactions. DCU 212 comprises two hierarchical levels of cache memory on-chip (L1$ and L2$) and a third cache level (L3$) accessible through EIU 214. DCU 212, alternatively referred to as the data cache subsystem, comprises separate instruction and data caches (labeled I$ and D$ in FIG. 3) at the primary level 1 cache L1$, a unified on-chip level 2 cache L2$ and a unified external level 3 cache L3$. DCU 212 also includes controller logic and associated queues at each level, as will be described in greater detail below with reference to FIGS. 4–5. One or more of the cache levels within DCU 212 may be read only memory to eliminate the logic associated with cache writes. As used herein, the term "higher" cache level refers to a cache level having a greater numeric label (i.e., L2$ is "higher" than L1$). Conversely, "lower" cache level refers to a cache level of smaller numeric label (i.e., L2$ is "lower" than L3$).

Memory system 104 in accordance with the present invention is illustrated in greater detail in FIG. 3 through FIG. 14. When processor 102 recognizes that data being read from memory is cacheable, processor 102 reads an entire 32-byte line into the appropriate cache (i.e., L1$, L2$, L3$, or all three). This operation is called a cache line fill. If the memory location containing that operand is still cached the next time processor 102 attempts to use the operand, processor 102 can read the operand from the cache instead of going back to memory. This operation is called a cache hit.

When processor 102 attempts to read data from memory 107, it first checks if a valid cache line for that memory location exists in the cache. A status bit can be associated with each cache line to indicate whether the line is valid (i.e., filled with known correct and up-to-date data). If a valid cache line exists, processor 102 reads the data from the cache instead of reading it from main memory 107. If a read misses the cache (i.e., a valid cache line is not present for the area of memory being read from), cache memory system 105 continues to determine if the read will hit in a higher cache level. In the case that the missing cache does not have a line allocated for the requested memory location, a line is allocated.

As the data is returned from higher cache levels or main memory, it is stored in the allocated cache line for future use. One feature of the present invention is that as the data is returned, it is also passed downward to lower cache levels and/or to any execution units in processor 102 that generated the cache access. For example, IEU 208 or FGU 210 could generate a cache access request while executing an instruction. Similarly, the level 1 caches (I$, D$) could generate a cache access request to the level 2 cache L2$, or the level 2 cache L2$ could generate accesses to the external level 3 cache L3$.

When processor 102 attempts to write data to a cacheable area of memory, it first checks if a cache line for that memory location exists in the cache. If a valid cache line does exist, processor 102 (depending on the write policy currently in force) can write the data into the cache instead of (or in addition to) writing it out to main memory 107. This operation is called a "write hit". If a write misses the cache (i.e., a valid cache line is not present for area of memory being written to and a "write-allocate on write-miss" policy is in effect), processor 102 performs a cache line fill by allocating a line for the requested data. Cache system 105 then writes the data from internal registers into the allocated cache line and (depending on the write policy currently in force) can also write the data to main memory 107.

Figure 3:
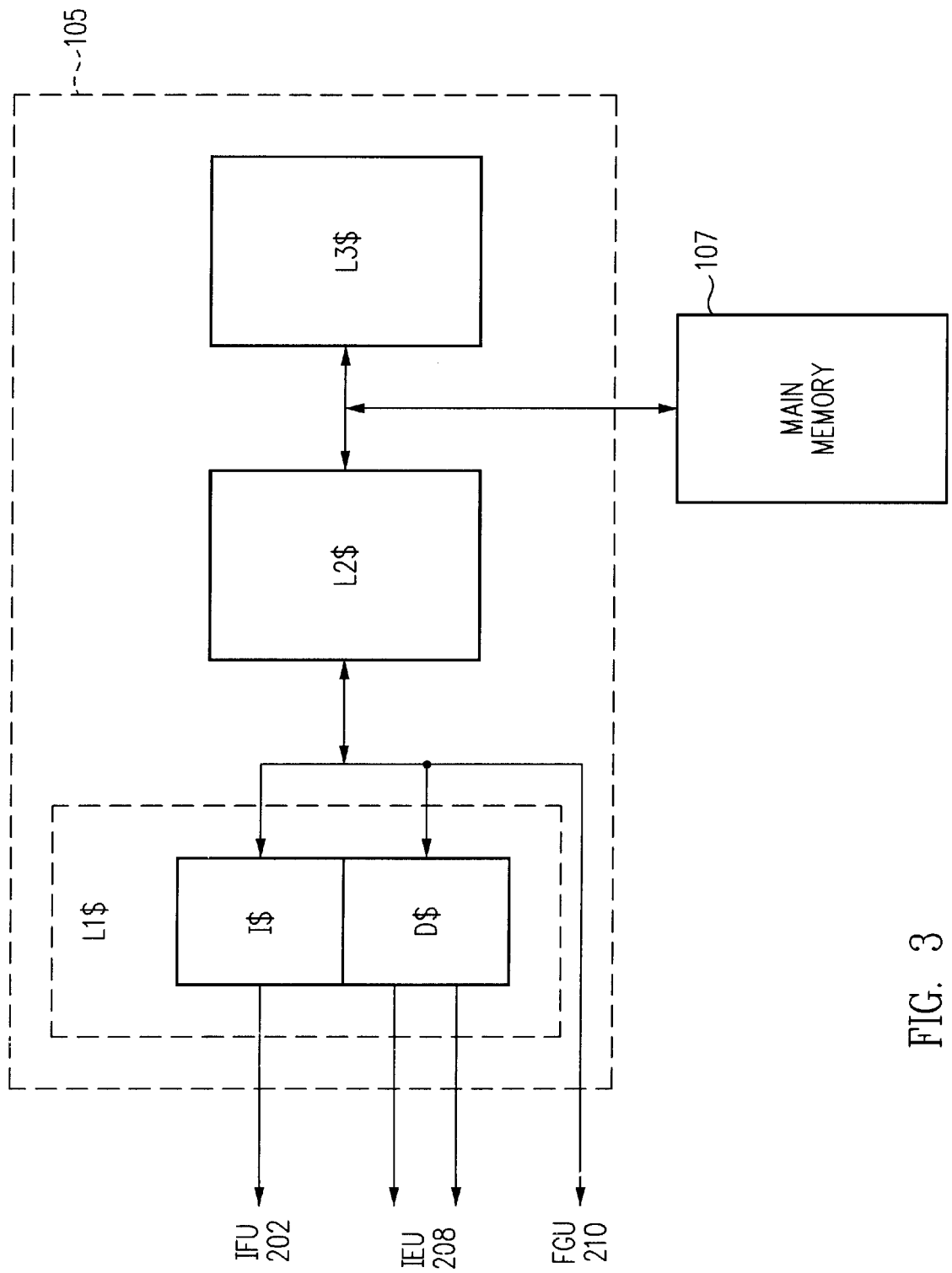
FIG. 3 illustrates in block diagram form a high level overview of a cache memory subsystem in accordance with one embodiment of the present invention.

FIG. 3 shows an example cache subsystem 105 in accordance with the present invention including the major data paths between these functional units. As explained below, each cache has a tag array for storing tags to the cache, and a data array for storing the data of the cache. The instruction cache, denoted as I$ in FIG. 3, is controlled by IFU 202 and provides one or more instructions per cycle to IFU 202. In a particular embodiment, I$ is non-blocking and is virtually addressed.

The level one data cache, denoted as D$, services one or more loads or stores per cycle to IEU 208. The level 2 cache L2$ is a unified instruction and data cache. As will be explained below, L2$ comprises four independent 8 byte read ports, a 16-byte write port, and a 16 byte fill and victim port in a specific implementation. Preferably, L2$ is a fully pipelined and non-blocking cache. Floating point data requests from FGU 210 are accessed directly from the L2$. Hence, L2$ is the primary cache for FGU 210 and the secondary cache for IEU 208.

The L3$ data array is off-chip while the L3$ tag array is on-chip in the particular embodiment of FIG. 3. Most architectures must implement at least some cache off-chip. Latency of the off-chip cache may be 20–50 times that of on-chip cache. The L3$ data array may be implemented using, for example, SRAM or dual data RAM (DDR). DDR is a synchronous component that provides a clock along with returned data that enables an extremely high data rate.

Main memory 107 shown in FIG. 3 can be implemented in any available RAM component such as DRAM, EDODRAM, SDRAM, or SDRAM2, which like the DDR SRAM, provides a clock along with data allowing it to provide high bandwidth performance. In a particular example, processor 102 generates a 45 bit physical address (PA) capable of physically addressing 32 TeraByte of memory.

Figure 4:
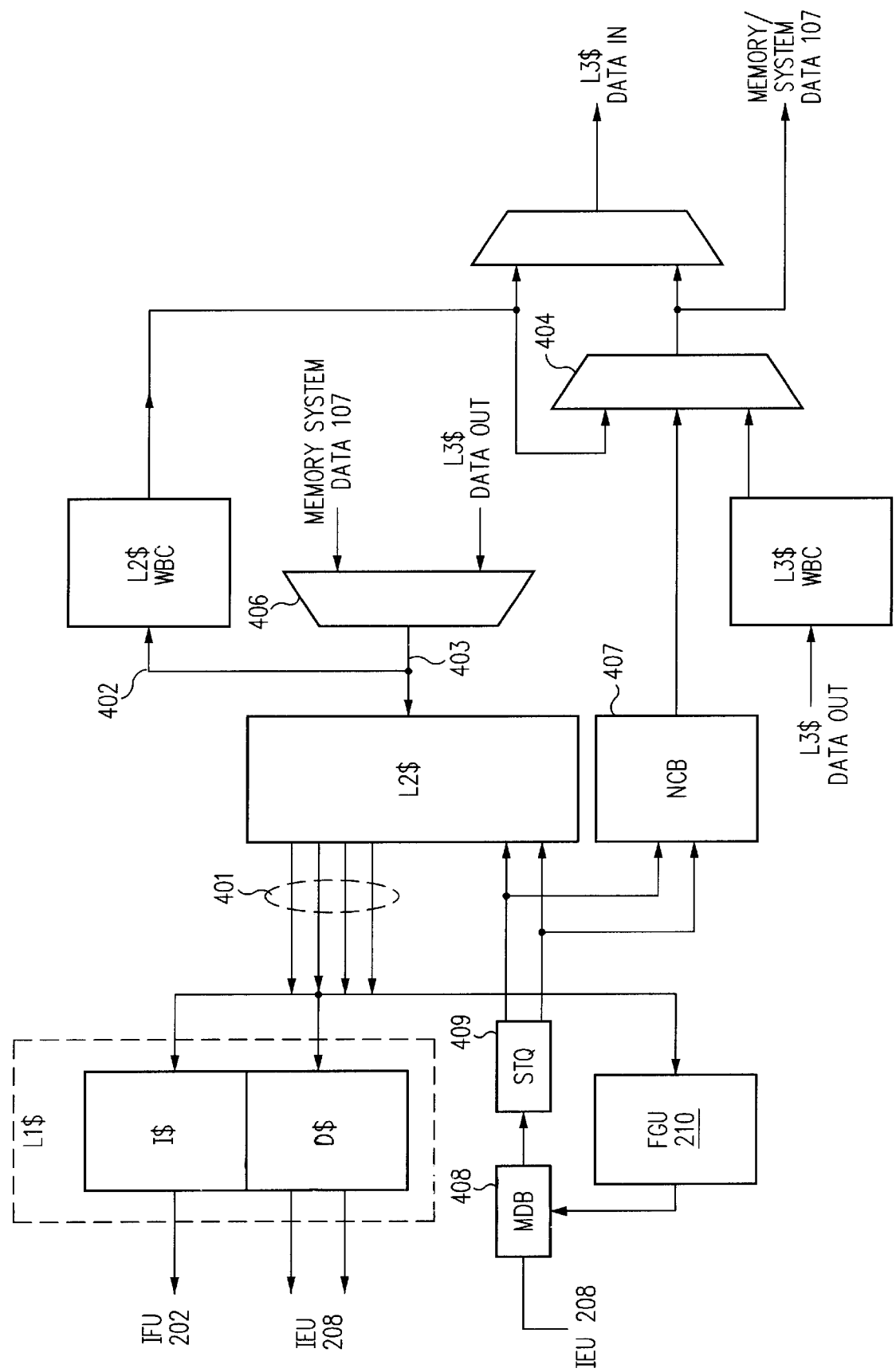
FIG. 4 illustrates in block diagram form the data paths and associated queues for a cache memory subsystem in accordance with the invention.

Referring to FIG. 4, the three-level cache of FIG. 3 is presented in greater detail and the data paths for the cache/memory subsystem 105 are shown. In one example, the first level cache L1$ is divided into an instruction cache I$ and a data cache D$, while the second level cache L2$ and the third level cache L3$ are unified caches having both instruction and data information stored therein.

The L1$, composed of the I$ and the D$, is coupled to the integer pipelines IEU 208 of the processor. The I$ has an instruction TLB for storing virtual-to-physical address translations within the memory subsystem. Further, the I$ has a tag portion for storing cache tags within the cache. Likewise, the D$ also has a portion dedicated to tag storage indexing entries contained therein.

Figure 5:
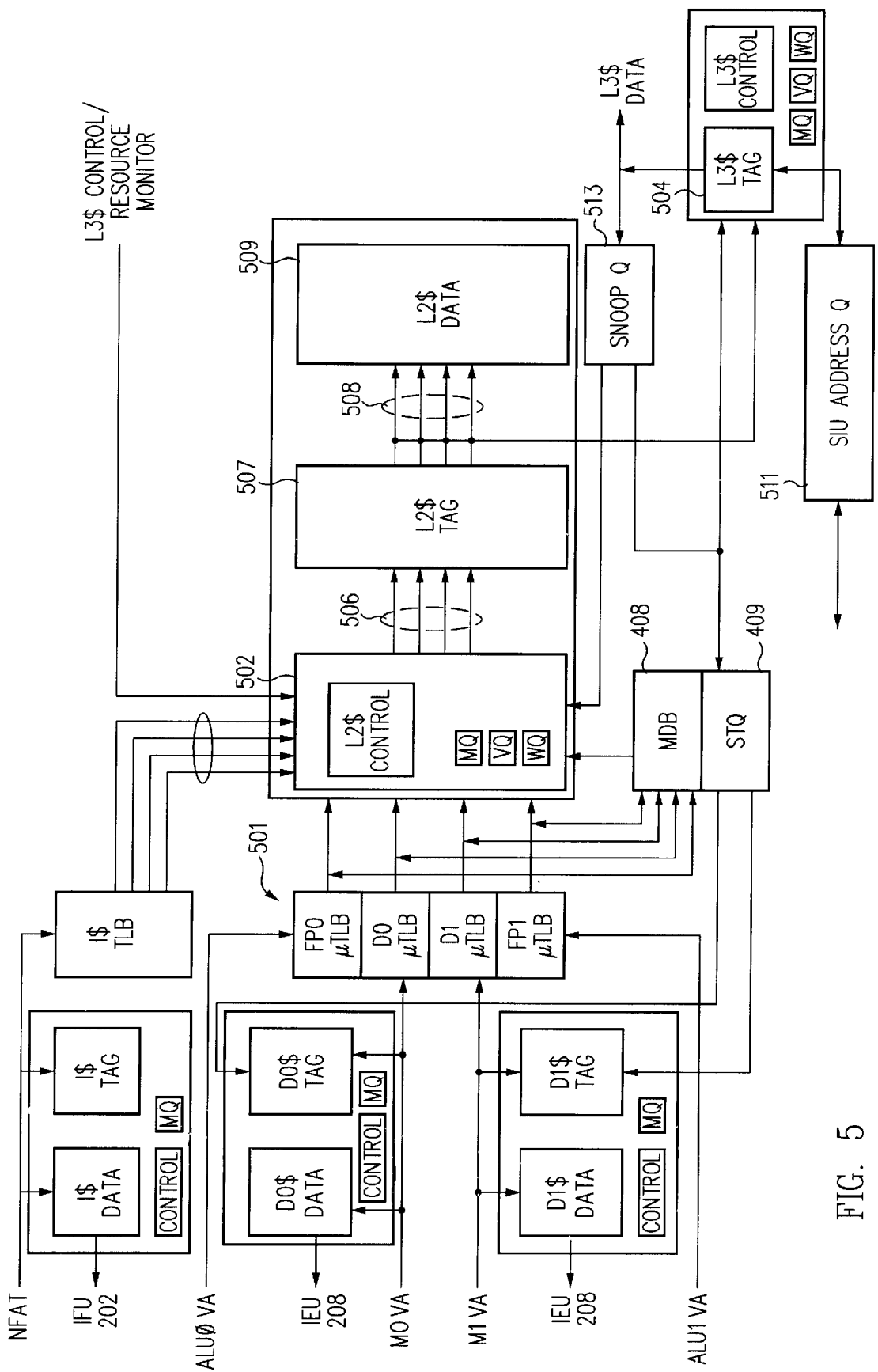
FIG. 5 illustrates in block diagram form the address paths, control logic, and associated queues for a cache memory subsystem in accordance with the resent invention.

The instruction cache I$ is accessed by IFU 202 and provides one or more instructions per cycle to IFU 202. In a particular example, I$ is non-blocking and is virtually addressed by the instruction pointer generator as described in reference to IFU 202. The level one data cache, denoted as D$, services one or more loads or stores per cycle to IEU 208. In the particular implementation shown in FIG. 5, two operations per cycle are implemented by replicating D$ into two separate 64 KBytes caches that are kept identical shown as D0$ and D1$. Other means of providing multiple accesses per cycle are known, and may be preferable in certain applications. However, duplicating D$ is straightforward, is compatible with high frequency operation, and an acceptable increase in hardware size because D$ is relatively small compared to higher cache levels. D$ is also implemented as a non-blocking cache and is indexed virtually from two independent memory pipes. In the example of FIG. 5, both copies of D$ are read only data caches (wherein write hits cause invalidation) to improve performance. It should be understood that read-write data caches may be substituted and make use of the teachings in accordance with the present invention with predictable impact on performance and complexity.

The L2$ is the unified cache for storing instructions and data to be provided to either the instruction or data cache of the L1$ or directly to the floating point pipelines, FGU 210. A TLB can also be provided before the L2$ to store previously accessed virtual-to-physical memory address translations. The L3$ data array, coupled to the L2$ and the main memory of the processor, is the unified cache located off chip. The L3$ also has a portion dedicated to storing cache tags which can be located on-chip.

Referring to FIG. 4, L2$ comprises four independent 8 byte read ports 401, a 16 byte write port 402, and a 32 byte fill and victim port 403 in a specific implementation. Preferably, L2$ is a fully pipelined, and non-blocking cache. Floating point data requests from FGU 210 are accessed directly from the L2$. Multiplexor 404 under control of cache unit 105 selectively couples either the output of the L3$ write-back cache (WBC), the output of the L2$ WBC, or output of non cacheable store buffer 407, to main memory 107. A write back cache is provided to buffer data evicted from the cache so that the data can be written back to a higher level cache or main memory. In subsequent figures, the WBC is variously called a victim queue or VQ. Multiplexor 406 under control of cache unit 105 selectively couples the L3$ output or data from the memory system bus 107 to place on fill/victim port 403.

A data path from L2$ to I$ is 256 bits (32 bytes) wide in a particular example. The specific byte widths of access ports and data paths are provided to illustrate relative scale between components and are not a limitation on the teachings of the present invention. It is well known to adjust the data path widths to achieve particular operational performance. Both copies of the L1$ data caches D0$ and D1$ are filled from the L2$ with identical data from the same 32 byte port. Because they are read only, independently reading the caches does not raise any coherency issues. If the multiple D$ caches were write enabled, additional measures would be required to ensure cache coherency between the D$ copies.

As shown in FIG. 4, a memory disambiguation buffer (MDB) 408 feeds a store queue (STQ) 409. ISU 206, shown in FIG. 2, generates loads following un-retired stores that may potentially access the same address. Detection of a "read after write" (RAW) hazard occurs in MDB 408 and this event generates a bypass of the store data to the pipes. MDB 408 also feeds STQ 409 where store coalescing will occur and the eventual write to the L2$. Store coalescing reduces memory traffic by combining two or more memory operations into a single operation where the operations affect the same blocks of data and that data is stored in STQ 409.

The external data array of the L3$ is accessed via an on-chip tag store in accordance with the present invention.

In a particular example, L3$ is 4-way set associative with a 256 bit data bus. The data bus connection to main memory 107 (and the system) is 128 bits wide.

In one embodiment when the data is to be written out to the L3$, it is first written to the write back cache unit L2$ WBC, and then written from the L2$ WBC unit to the L3$ WBC. When the data is to be written out to memory, it is written first into the L3$ write back cache unit, and then written from the L3$ WBC unit to memory when the system bus is available.

FIG. 5 illustrates the address paths for cache/memory subsystem 105. The first level caches (I$ and all copies of D$) are virtually indexed and physically tagged. These caches have each line indexed by virtual address, however the tag bits are from the physical address determined after the virtual address is translated. In a particular implementation, I$ is 64 KByte four-way set associative cache that is addressed by a next fetch address table (NFAT) within IFU 202. Desirably, I$ is fully wave pipelined delivering 8 instructions per cycle. A miss in I$ is satisfied from either the L2$ or an instruction pre-fetch streaming buffer (not shown). Other implementations of I$ are possible including direct mapped, 2-way set associative, and fully associative and may be desirable in some applications. Accordingly, these other implementations of the I$ are equivalent to the specific embodiments described herein for purposes of the present invention. In a particular example, IEU 208 includes two memory pipes M0 and M1 generating effective virtual addresses (indicated by M0 VA and M1 VA in FIG. 5) for integer and floating point load and store operations. IEU 208 also includes two arithmetic logic units (ALU0 and ALU1) generating virtual addresses (indicated by ALU0 VA and ALU1 VA) dedicated for floating point loads and stores. Virtual to physical address translation occurs in a conventional manner through micro translation lookaside buffers ($\mu$TLBs) 501 that are hardware controlled subsets of a main translation lookaside buffer (TLB) (not shown). TLBs store the most-recently used virtual to physical address pairs to speed up memory access by reducing the time required to translate virtual addresses to physical addresses needed to address memory and cache.

In the implementation shown in FIG. 5, four integer/floating point loads are generated per cycle into the L2$. The entry point into the L2$ is via the L2$ control 502 that tracks all memory operations not satisfied by the level 1 caches. The L2$ control functions to track all outstanding memory requests, retain addresses for fills and snooping and perform bank conflict resolution so that all four ports are afforded access the each of the banks of the L2$. In a specific example, the L2$ comprises 16 banks of 32 Kbyte memory. All four $\mu$TLBs generate addresses to MDB 408 and STQ 409 described hereinbefore. MDB 408 performs dynamic memory address disambiguation that enables the out-of order execution of memory operations (e.g., LOAD and STORE operations).

Access to the L2$ is controlled by the L2$ controller 502 shown in FIG. 5 which is a tracking mechanism for all accesses that caused a miss in the L1$ (I$ and D$ caches), FGU 210, the prefetching hardware in IFU 202, or the operating system during snoops. The L2$ controller includes four address ports 506 each of which can couple a new address to L2$ TAG 507 every clock cycle. L2$ TAG 507 operates in a conventional manner to index each line in L2$ data portion 509 via lines 508. In the example of FIG. 5, L2$ TAG 507 and L2$ data portion 509 are organized as a four-way set associative cache.

The present invention could alternatively be implemented in a direct mapped cache in which each main memory address maps to a unique location in the cache. In fully associative cache, data from any main memory address can be stored in any cache location. All tags must be compared simultaneously (i.e., associatively) with the requested address, and if one matches, then its associated data is accessed. Set associative cache is a compromise between direct mapped cache and a fully associative cache where each address is mapped to a set of cache locations. The four-way set associative cache of the specific example allows each address to map to four different cache locations.

L3$ memory control maintains a record of L2$ misses that are directed to the external L3$ and to main memory 107. It may be desirable to maintain the L3$ TAG unit 504 on-chip even where the external cache is off-chip for high bandwidth and low latency. On-chip L3$ TAG 504 also supports an off-chip associative cache. On-chip L3$ TAG unit 504 enables processor 102 to filter system coherence snoops from EIU 214 to minimize the impact of snoops on processor 102 except when a match to the L3$ TAG is detected.

The operating may support an ability to "snoop" accesses to system memory and to their internal caches via snoop queue 513. This snooping ability is used to keep internal caches consistent both with system memory and with the caches in processor 102, particularly in multiprocessor applications.

Referring to FIG. 5, in accordance with the present invention, three types of queueing structures are presented for the distributed multi-level cache. A miss queue, shown as MQ, is provided at each level of the cache hierarchy for storing or buffering the address of a miss of the cache, and forwarding the returned data to lower levels within the cache hierarchy when the miss is serviced. For instance, if in response to a data request in the L1$ data cache D$, a miss is generated, the address of the miss is placed in the miss queue of the L1$ which thereafter generates a request for the data at the specified address to the L2$. If the requested address is not present within the L2$, then the address is placed within the miss queue of the L2$ and a corresponding request is made thereby to the L3$. Likewise, the L3$ is provided with a miss queue. If the L3$ does not contain the requested information, the specified address is placed in the miss queue of the L3$ which generates an access to main memory for the requested information.

In one embodiment of the invention, the L1$ instruction and data caches are write-through caches, while the L2$ and L3$ are write-back caches. A write-through cache insures that any modification to the data contained therein is reflected in the next level of the cache hierarchy. The write-back caches of the cache hierarchy of the present invention are provided with a victim queue (VQ) and a write queue (WQ) in addition to the miss queue (MQ) discussed above. The victim queue of a cache level stores entries which have been evicted from the current cache due to a fill operation. Because the eviction of the entry in the cache may remove a "dirty" entry which needs to be written back to the next higher level of the cache or main memory, the victim queue stores the evicted dirty entry until the write back is performed. In one example, the victim queue holds the address and data of the evicted dirty entry.

The write queue WQ associated with the cache level provides a buffer to store a write request. The write requests are buffered until a write hit is achieved, or in other words, the address needed to write into the present cache is obtained. Handling a write miss is essentially the same as handling a read miss with an extra step that when the data arrives back, an update of data within the cache occurs. To handle a write miss, the determination is made as to where within the cache the data written will be placed, which may involve an eviction of a dirty line within the cache, requiring an entry placed into the victim queue. A read miss is then generated to the next higher cache level and the requested data is then returned and written into the correct location in the present cache. Once the data is received and placed within the selected line of the present cache, the write operation can proceed to write the new data into the cache at the determined location. The write queue buffers the write request of new data while this multi-step process is occurring.

As can be seen in FIG. 5, each cache level within the cache hierarchy has a multiplicity of entities which can make access requests to the cache. For instance, the L2$ shown in FIG. 5 can receive requests from the floating point execution unit 210 of the processor, the miss queue of the L1$ data cache D$, or the miss queue of the L1$ instruction cache I$. Similarly, the L1$ and the L3$ also have numerous entities which can request information therefrom. As will be explained below, a cache controller is provided at each cache level to controllably prioritize between the various agents requesting access to each cache level within the multi-level cache hierarchy.

Furthermore, in accordance with the present invention, each cache level is multi-ported to permit access to desired quantities of data to be supplied by the cache to the processor. A read port allows for the presentation of an address to the cache and the return from the cache of the data stored at that address. A write or fill port permits the presentation of data to the cache from higher levels, with the associated address, to be stored within the cache. FIGS. 6A–6D illustrate, by way of example, the porting structure for the various levels of caches described above.

Figure 6A:
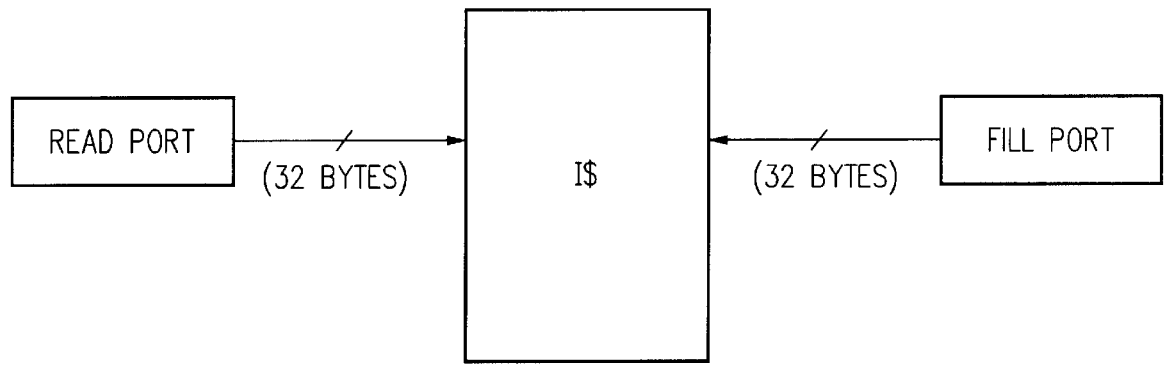
FIG. 6A illustrates the ports associated with the level 1 instruction cache (I$) in accordance with one embodiment of the present invention.
Figure 6B:
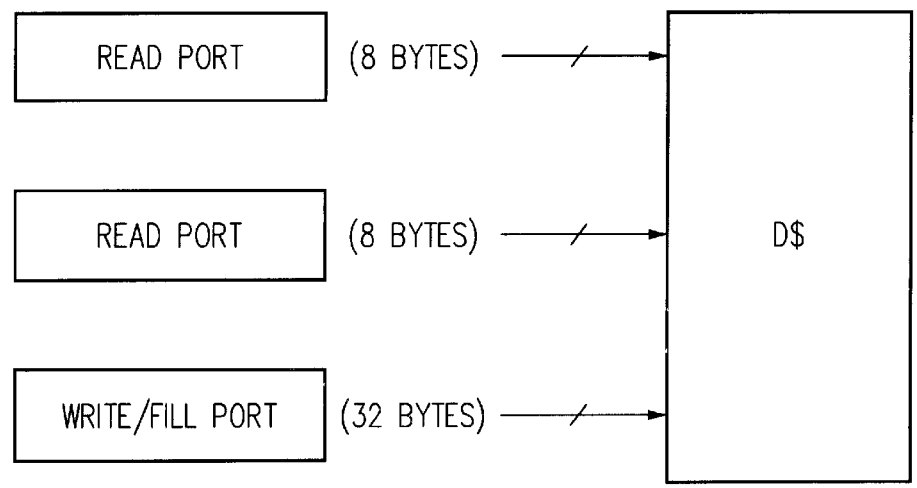
FIG. 6B illustrates the ports associated with the level 1 data cache (D$) in accordance with one embodiment of the present invention.
Figure 6C:
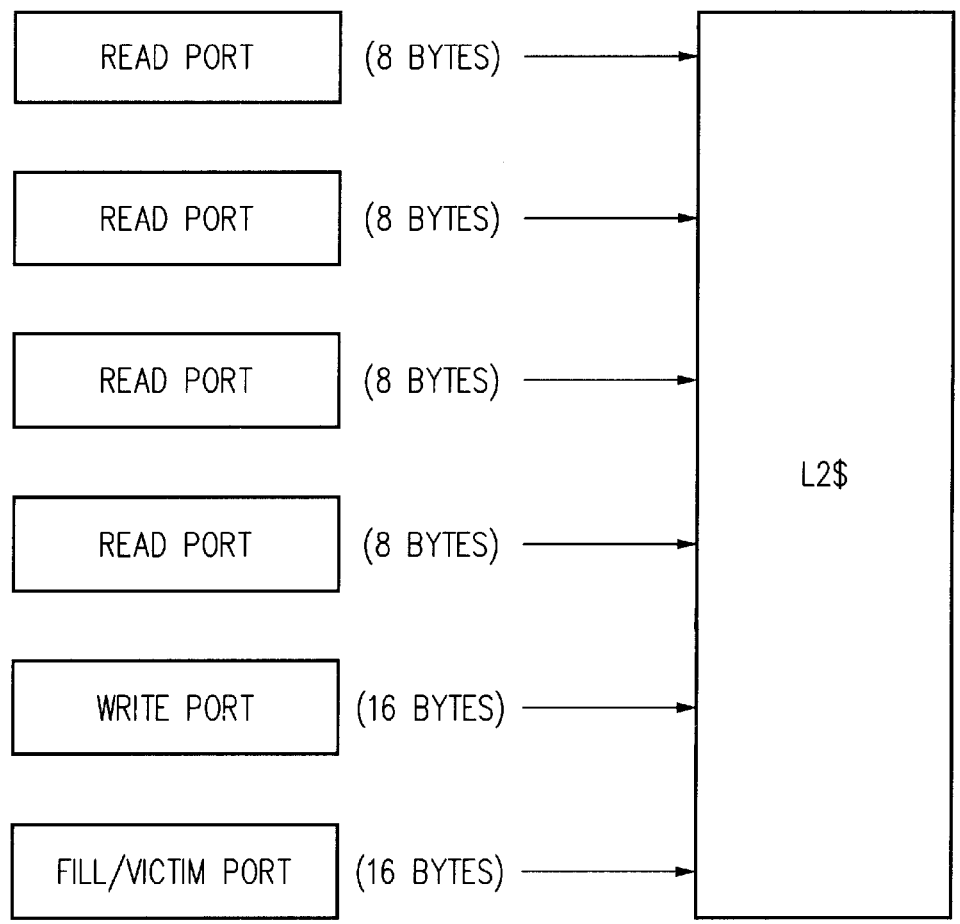
FIG. 6C illustrates the ports associated with the level 2 cache (L2$) in accordance with one embodiment of the present invention.
Figure 6D:
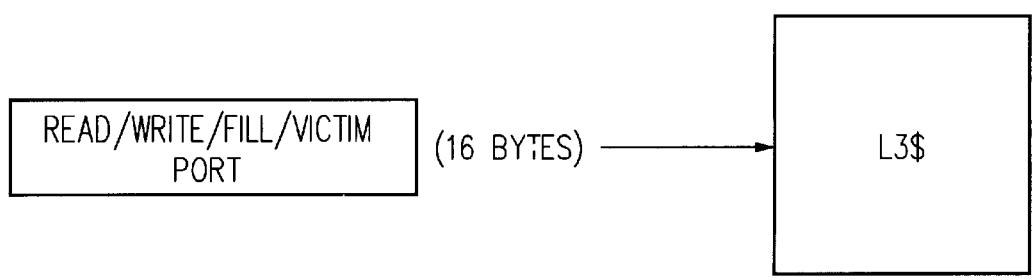
FIG. 6D illustrates the ports associated with the level 3 (L3$) cache in accordance with one embodiment of the present invention.

FIG. 6A shows the I$ having a 32 byte read port and a 32 byte fill port. FIG. 6B illustrates the data cache D$ having two 8 byte read ports, and a 32-byte write/fill port. FIG. 6C illustrates the unified L2$ as having four 8 byte read ports, a 16 byte write port, and a 16-byte fill/victim port. FIG. 6D illustrates the unified L3$ as having a 16-byte read/write/fill/victim port. It is understood that the port designs shown in FIGS. 6A–6D are by way of example only and can be varied depending upon the particular design implementation chosen.

Figure 7:
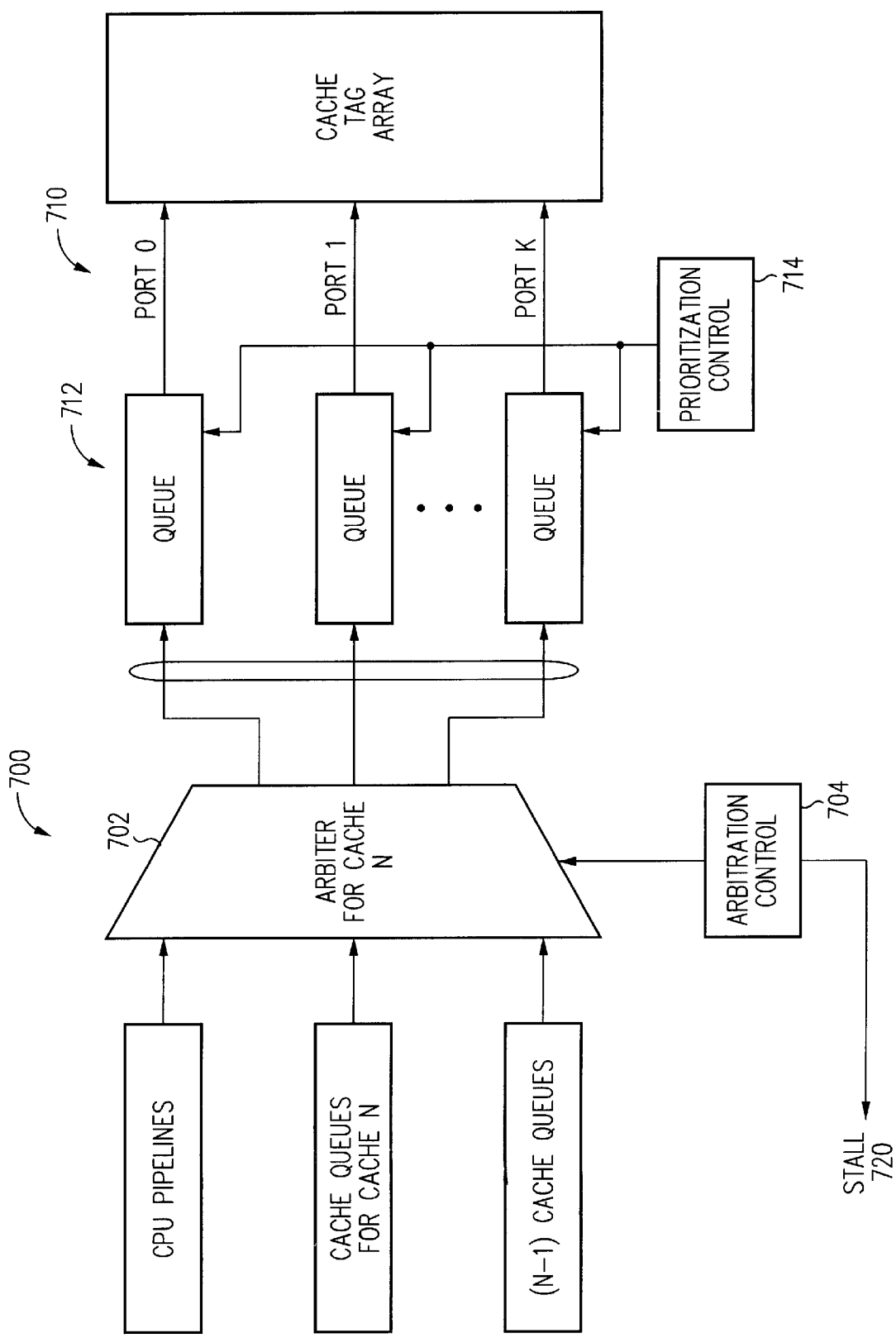
FIG. 7 illustrates an arbiter for a cache level (N) to resolve accesses from multiple requesting agents to the cache in accordance with one embodiment of the present invention.

As previously mentioned, because of the number of agents requesting access to a given cache level, a controller is provided at each cache level for arbitrating and prioritizing between the access requests, coordinating interactions between the queues, and performing general cache housekeeping functions. FIG. 7 illustrates an arbiter 700 in accordance with the present invention for arbitrating between cache access requests. The arbiter acts as a gating structure which controls all accesses to the cache tag array. In one example, the arbiter includes a multiplexor or selector 702 with control logic 704. The arbiter can be included within the cache controller at each cache level if desired. The arbiter is coupled to any agent which requests access to the cache, such as CPU pipelines, the queues of the present cache level such as the miss queue, and the queues of the lower level cache as shown in FIG. 7. After the arbiter selects the request to be serviced, data is returned from the cache to service the request.

The output of the arbiter is pipelined into the ports of the cache tag array. In a particular example, the arbiter places access requests on various ports 710 of the cache tag array, and a queue or buffer 712 can also be provided to store access requests at each port. The queues 712 provided on each port of the cache permit the arbiter to accept new cache requests each clock cycle which are subsequently presented to the cache for processing.

A prioritization control 714 is provided to dynamically re-prioritize the accesses to the cache which get serviced when the cache has reached a stall condition, as will be described below.

In accordance with the present invention, the cache controller also detects structural stall conditions within the cache and generates a stall signal 720 to the front end of the processor. This suspends acceptance of new cache requests from the CPU functional units while allowing pending memory requests to complete. In this manner, the CPU is prevented from "live locking" when any of the resources within the cache subsystem are saturated. For instance, since each queue associated with a cache level has a finite number of entries, it is possible that all of the slots in a queue can become full, resulting in a resource exhaustion condition. In this instance, additional cache requests are suspended by the stall signal so that the pending requests already in the queue can be processed, thereby insuring the integrity of the data within the cache hierarchy. The prioritization control 714 also dynamically re-prioritizes any pending cache access requests stored in the queues to permit forward progress within the cache during a stall condition.

In accordance with the present invention, the controller at each cache level can provide an anticipatory stall signal 720 to the front end of the processor. The stall signal is anticipatory in that the controller will generate the signal when a cache resource, such as the miss queue, the victim queue, or the write queue, has become filled with entries to a first level. The first level is some level below the total capacity of the resource or queue, because during the time required for the stall signal to propagate to the front end of the processor, it is possible that additional cache requests are already in flight to be received and processed at the cache. The expected amount of propagation delay for the stall signal to propagate to the processor's front end is a function of the number and depths of pipelined functional units used within the processor.

Figures 8, 9:
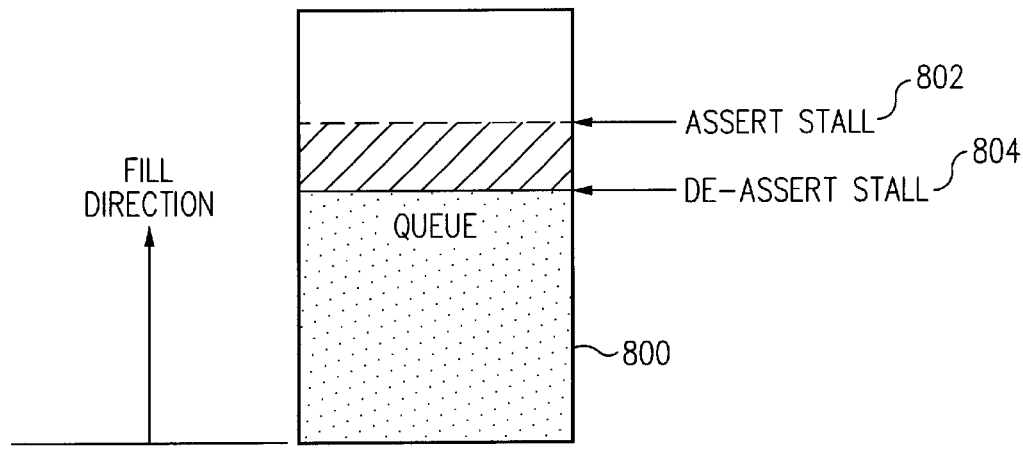
FIG. 8 illustrates the high and low water marks of a cache queue for dynamically asserting a stall condition for the queue in accordance with one embodiment of the present invention.
FIG. 9 illustrates the cache access request types in accordance with the present invention.

FIG. 8 illustrates an example of a queue 800 and the first level 802 where the anticipatory stall signal is asserted, as well as the second level 804 where the stall signal is de-asserted. The queue 800 shown is generally representative of, for example, the miss queue, the victim queue, the write queue, or other buffering or queueing resource of the cache system. When the number of entries within the queue reaches the first level 802, the stall is asserted to essentially block off all new requests to the cache from the front end of the processor. The arbiter 704 and prioritization control 714 (FIG. 7) then handle the processing of the pending cache requests so that forward progress within the processor can be made. When the number of entries in the queue reach the second level 804, the stall signal can be de-asserted so that new cache requests are accepted and processed by the cache. The second level can be set at a level higher than normal so that de-asserting the stall signal also accounts for the propagation delay in the de-assert signal reaching the front end of the processor. During this delay time, the arbiter and prioritization controller will process entries in already in the queues, so the stall signal should be anticipatorily de-asserted.

FIG. 9 illustrates the type of cache access requests generated within the multi-level cache hierarchy shown in FIG.

5. As indicated in FIG. 9, both the first level instruction and data caches I$ and D$ can receive a processor read request (P_rd), a processor write request (P_wr), a miss queue read request (MQ_rd), a miss queue write request (MQ_wr), and a snoop request.

In multi-processor configurations utilizing shared memory, prioritized handling of snoop requests permit all single processors to maintain a coherent view of main memory data in the cache subsystem. Snoops are desirably supported at every level within the cache hierarchy, and can be provided with a dedicated port to provide high priority access which circumvents any cache arbitration normally required at each cache level. The snoop request has, in one embodiment, a specialized dedicated port providing the snoop request with high priority access to the cache.

The L2$ receives a processor read request (P_rd), a processor write request (P_wr), a miss queue read request from the instruction cache (MQ_rd_I$), a miss queue write request from the instruction cache (MQ_wr_I$), a miss queue read request from the data cache (MQ_rd_D$), and a miss queue write request from the data cache (MQ_wr_D$). The L2$ cache also receives a victim queue read request (VQ_rd), a victim queue write request (VQ_wr), and a write queue write request (WQ_wr), as well as a snoop request.

The L3$ receives access requests of a miss queue read (MQ_rd), a miss queue write (MQ_wr), a victim queue read (VQ_rd), a victim queue write (VQ_wr), and a write queue write (WQ_wr), as well as a snoop request.

FIGS. 10A–10B illustrate one example of the prioritization of access requests which can be used by the prioritization control with the caching hierarchy shown in FIGS. 3–5, and 7. Referring to FIG. 10A, prioritization during normal operations is shown. As previously mentioned, the snoop request has a high priority to maintain data consistency and validity within a multi-processor system. The miss queue write $MQ_{13}$ wr and miss queue read MQ_rd requests are given high priority so that cache misses can be resolved quickly within the cache hierarchy. The processor read P_rd and write queue writes WQ_wr and victim queue VQ_rd are given intermediate priority, while the victim queue write VQ_wr and processor write P_wr requests are given lower priority. The particular prioritization levels afforded to each type of access request will be dependent upon the performance desired for the particular implementation of the cache memory system.

FIG. 10B lists the actions which can be taken by the prioritization controller during a stall condition to dynamically re-prioritize handling of the cache access requests in a particular embodiment. The processor front end is signaled with the stall signal to stop generating cache requests. The cache controller no longer accepts new processor read requests P_rd or new processor write requests P_wr. The victim queue read requests VQ_rd, the write queue write requests WQ_wr, and the victim queue write requests VQ_wr are boosted in priority which will allow the cache system to free up space within its queues. Additionally, the priority of existing miss queue read requests MQ_rd, processor read requests P_rd, and processor write requests P_wr are lowered.

In accordance with the present invention, multiple cache misses can be efficiently handled at different levels of the cache hierarchy by merging the cache misses for memory words which are located within the same cache block. The merging of the cache misses increases the bandwidth available for transferring data between the main memory and the processor, thereby improving performance within the processor. Merging of cache misses will be described with reference to FIG. 11.

In a non-blocking cache with multiple cache levels, merging of multiple misses to the same cache line can improve the performance of the cache memory subsystem if the address of the data of interest falls within the same cache line. The first cache miss associated with a cache line is referred to herein as the primary miss. Each primary miss is tagged with a primary bit identifying the miss while the miss propagates through the cache hierarchy. As the primary miss is serviced, the address and data associated with the primary miss is stored in one or more levels of the cache hierarchy. If a subsequent miss to the same cache line occurs at a lower level of the cache hierarchy, the subsequent miss can reference cache line that is already being referenced by the previous primary miss. The subsequent miss is referred to herein as the secondary reference or secondary miss. When the secondary miss propagates through the system, its address is matched against the addresses or tags of entries already stored within the cache miss queues at the various levels. In this manner, the present invention is said to "merge" multiple misses to the same cache line and satisfy the secondary misses in an efficient manner. The merging of multiple misses is particularly advantageous with floating point load or store instructions which utilize adjacent memory locations.

Figure 11:
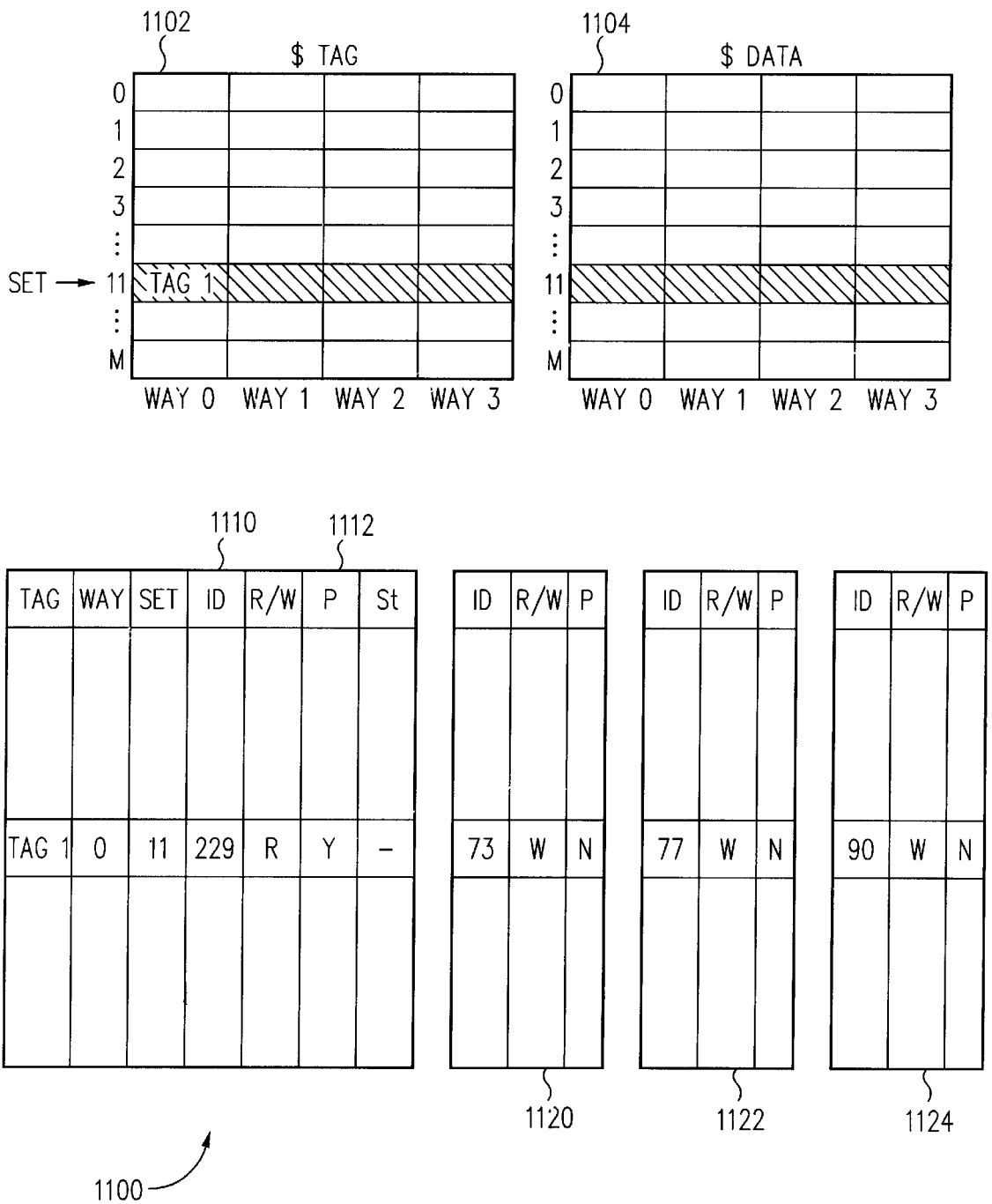
FIG. 11 illustrates a miss queue associated with a non-blocking cache, and containing a primary/secondary bit for merging cache misses in accordance with one embodiment of the present invention.

One embodiment of a miss queue 1100 is shown in greater detail in FIG. 11, along with a tag structure 1102 and a data structure 1104 for a cache. In this example, a 4-way associative cache is illustrated, and a tag corresponding to set 11 is shown as the desired cache line.

In accordance with the present invention, in the miss queue 1100, each entry is provided with an instruction ID (shown as ID) 1110 and a primary/secondary bit 1112. The primary bit indicates that the instruction generated a miss at any level in the cache subsystem. The miss queue 1100 can also be provided with a tag indicator, a way indicator, a set indicator, read/write indicator, and a state indicator for uniquely identifying the entry and its characteristics in the miss queue 1100.

Three secondary arrays 1120, 1122, and 1124 are provided for merging the memory access to an address that is within the same cache line as a prior primary miss. As shown in FIG. 11, the secondary arrays provide a list of secondary instruction identifiers within the same cache line. The secondary arrays can be provided with an instruction ID corresponding to the instruction requesting the cache data, a read/write indicator, and a primary bit for each entry therein. As the primary miss is processed within the memory hierarchy, the IDs of the secondary references are sent back to the front end of the processor so that these loads can be rescheduled because data associated with those loads is now being accessed and satisfied by the primary miss. The cache controller can then invalidate the entries within the window that have been satisfied by the data provided in the cache line. In this way, the secondary references do not each individually generate requests to be satisfied by higher levels of the cache or main memory to re-access the same cache block, thereby reducing the workload on the cache subsystem.

The method for merging misses may be particularly useful in a cache system utilizing sub-blocking techniques. If the cache misses at the second level, and the secondary bit is active for the instruction requesting the data, the L3$ simply ignores the miss request and does not seek to satisfy the secondary miss. This occurs because all secondary misses will have been satisfied when the primary miss is satisfied, thereby eliminating the need for the secondary miss to access the L3$ or main memory.

Figure 12:
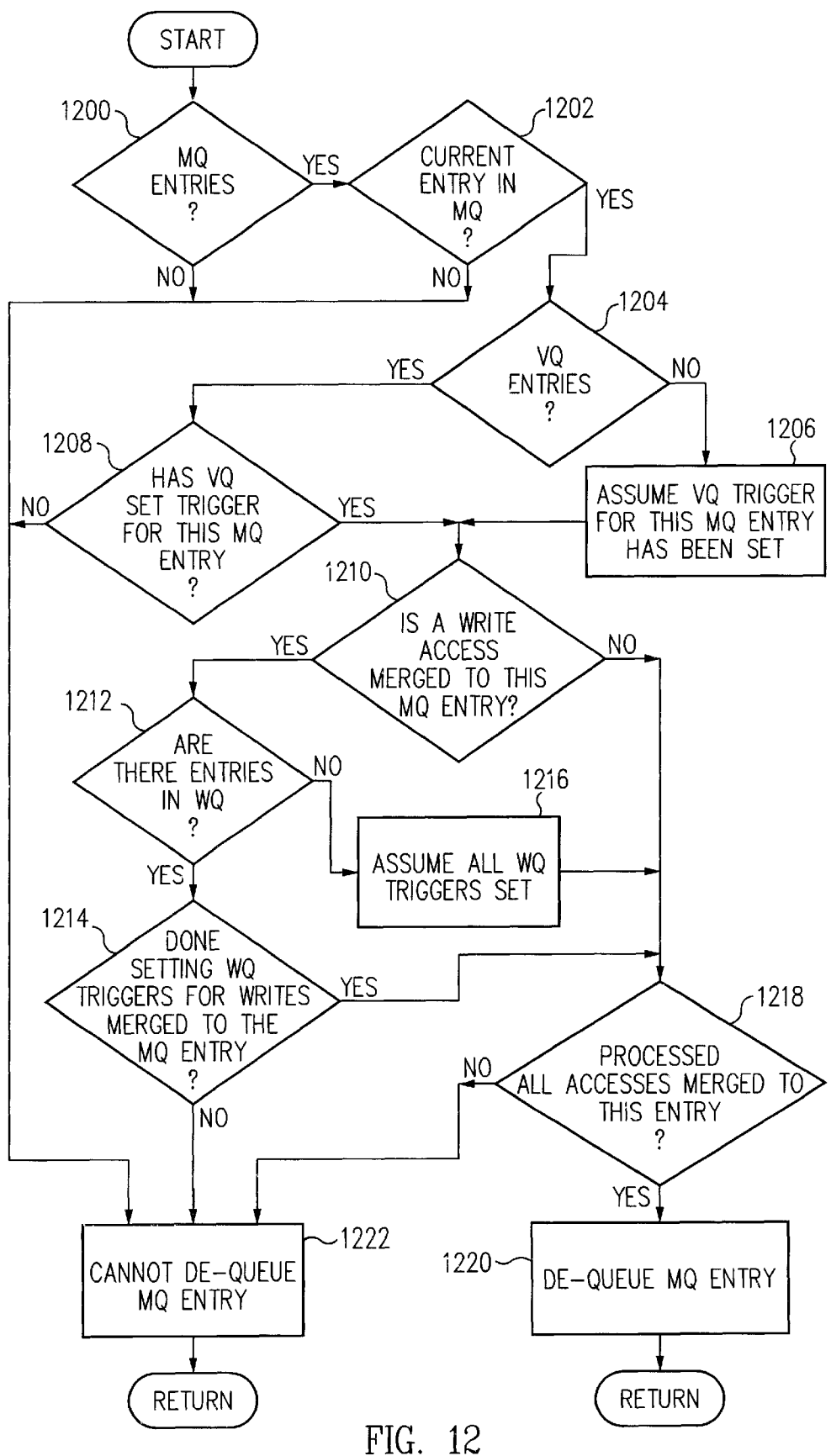
FIG. 12 illustrates a flow diagram of the control logic for the miss queue of a cache in accordance with one embodiment the present invention.
Figure 13:
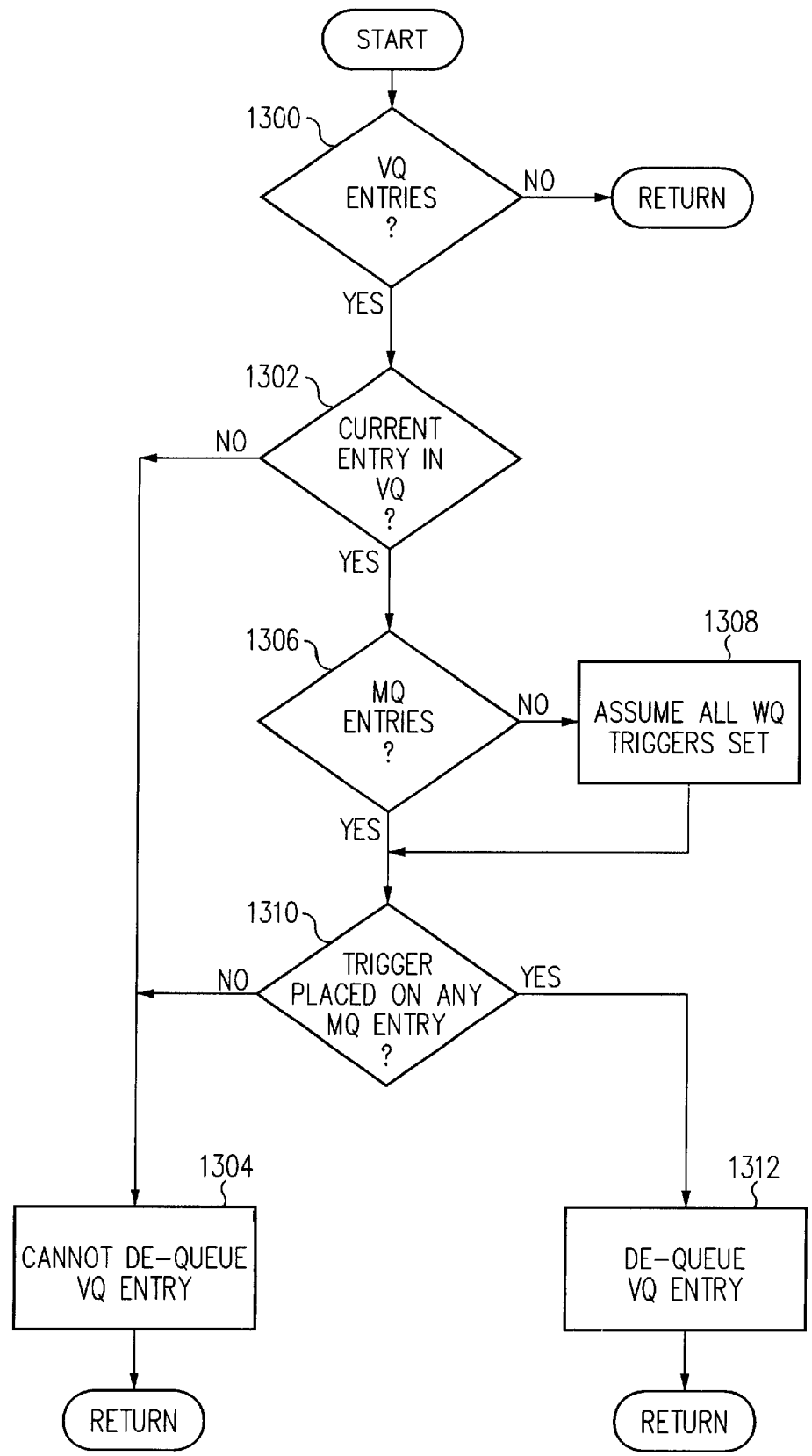
FIG. 13 illustrates a flow diagram of the control logic for the victim queue of a cache in accordance with one embodiment of the present invention.
Figure 14:
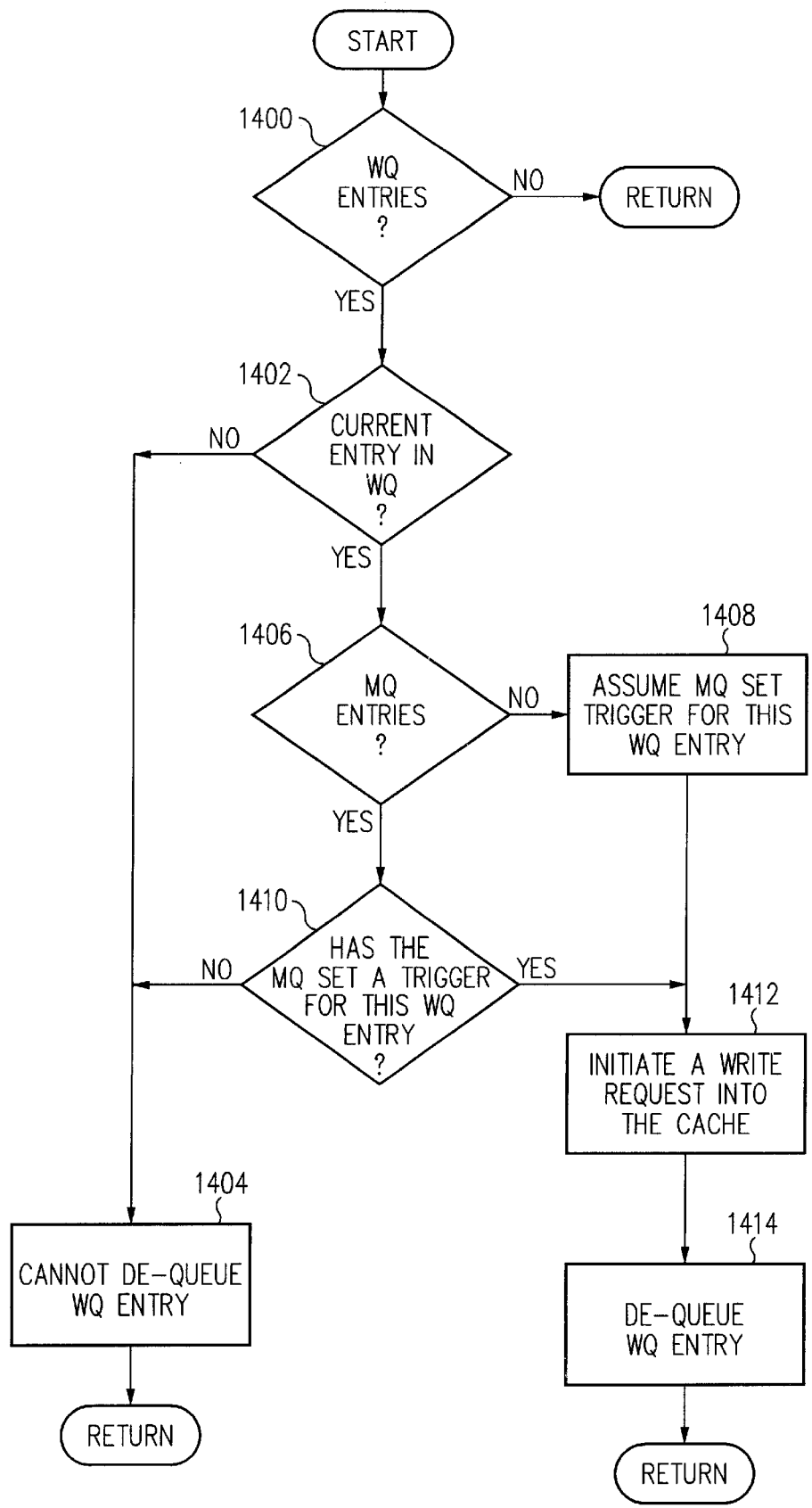
FIG. 14 illustrates a flow diagram of the control logic for the write queue of a cache in accordance with one embodiment of the present diagram.

FIGS. 12–14 illustrate the controller logic for various queues distributed throughout the multi-level cache system shown in FIG. 4. These logical operations can be performed by or implemented within the controller at each cache level, or combined with the functions performed by the arbiter provided at each cache level. These diagrams show a transaction protocol between the queues associated with each cache level. In particular, these diagrams show the manner in which the victim queue communicates with the miss queue, and the miss queue communicates with both the victim queue and write queue. The write queue communicates only with the miss queue, and does not communicate with the victim queue in a particular example. A state machine implementation can be used to effect the flow diagrams illustrated in FIGS. 12–14.

Referring to FIG. 12, the controller logic for the miss queue is shown. This logic affects a handshake between the miss queue and both the victim queue and write queues for processing read and write accesses. Operation 1200 determines if there are any entries in the miss queue for processing. Upon detecting an entry present in the miss queue, operation 1202 determines if the current entry requesting cache access has an entry in the miss queue. Operation 1202 can be implemented by comparing the memory access identifier to the entry within the miss queue. If the current entry has an entry in the miss queue, then operation 1204 determines if the victim queue has any entries therein. If so, operation 1208 determines if the victim queue set a trigger for this miss queue entry. A trigger is set by the victim queue for an entry when the entry has been evicted from the cache.

If the current entry is not in the miss queue as determined by operation 1202, or there are no entries in the miss queue as determined by operation 1200, then control is passed to operation 1222. If there are no entries in the victim queue as determined by operation 1204, then operation 1206 assumes that a victim queue trigger for this miss queue entry has already been set. Control is then passed by operation 1206 to operation 1210.

If operation 1208 determines that the victim queue set a trigger for this miss queue entry, then operation 1210 determines whether a write access is merged to this miss queue entry. If a write access is merged, then control is passed to decision operation 1212, otherwise control is passed to decision operation 1218.

If decision operation 1208 determines that the victim queue has not set a trigger for this miss queue entry, then the miss queue entry cannot be de-queued as indicated at 1222. If decision operation 1210 determines that a write access is merged to the miss queue entry, then decision operation 1212 determines if there are entries within the write queue. If not, then operation 1216 assumes that all write queue triggers have been set, and control is passed to decision operation 1218. If decision operation 1212 determines that write queue entries exist, then control is passed to decision operation 1214. Decision operation 1214 determines whether the write queue triggers are completed for any write accesses which are merged to the miss queue entry. If so, then control is passed to decision operation 1218, discussed below. If not, then control is passed to operation 1222.

Decision operation 1218 determines whether all accesses merged to this miss queue entry have been processed. If so, then the miss queue entry is completed and can be removed or de-queued from the miss queue by operation 1220.

FIG. 13 illustrates a logical flow diagram of the controller logic for the victim queue. The victim queue communicates with the miss queue and the write queue for read and write misses. Operation 1300 determines if there are any entries within the victim queue. If so, operation 1302 determines if the current entry being processed is an entry in the victim queue. If not, then the victim queue entry cannot be removed or de-queued from the victim queue as indicated by operation 1304. If, however, operation 1302 determines that the current entry is an entry in the victim queue, then operation 1306 determines if the miss queue has any entries contained therein. If not, then operation 1308 assumes that all write queue triggers have been set and control is passed to decision operation 1310.

Decision operation 1310 determines if a trigger has been placed on any miss queue entry. If not, then the victim queue entry cannot be removed or de-queued as indicated by operation 1304. Otherwise, if a trigger has been placed on any miss queue entry, then the victim queue entry can be removed or de-queued from the victim queue by operation 1312.

FIG. 14 illustrates a flow diagram of the controller logic for the write queue. The write queue communicates with the miss queue for all write misses. Operation 1400 determines if there are any entries in the write queue. If so, decision operation 1402 determines if the current entry being processed is present in the write queue. If not, then the write queue entry cannot be removed or de-queued from the write queue as indicated by operation 1404. If decision operation 1402 determines the current entry exists in the write queue, then decision operation 1406 determines if the miss queue has any entries therein. If not, operation 1408 assumes that the miss queue has set a trigger for this write queue entry, and control is passed to operation 1412. If, however, decision operation 1406 determines that there are entries in the miss queue, then decision operation 1410 tests whether the miss queue set a trigger for this write queue entry. If not, then control is passed to operation 1404 and the write queue entry cannot be removed from the write queue. If operation 1410 determines that the miss queue has set a trigger for this write queue entry, then control is passed to operation 1412.

Operation 1412 initiates a write request into the cache. Operation 1414 then removes the write queue entry from the write queue after the write request was initiated at operation 1412.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to a preferred embodiment thereof, it will be understood by those skilled in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. A cache memory system comprising:

a first non-blocking cache receiving access requests from a plurality of functional units in a processor, said first non-blocking cache being a multi-port write through cache including at least one read port and at least one write port;

a first miss queue dedicated to storing entries corresponding to access requests not serviced by said first non-blocking cache;

a first cache controller, said first cache controller including an arbiter, said first cache controller for controllably prioritizing between said functional units requesting access to said first non-blocking cache;

a second non-blocking cache adapted to receive access requests from said first miss queue and from said functional units said second non-blocking cache being a muti-port write back cache including at least one read port and at least one write port;

a second miss queue independent of the first miss queue and dedicated to storing entries corresponding to access requests not serviced by said second non-blocking cache;

a first victim queue, said first victim queue dedicated to storing entries that have been evicted from said second non-blocking cache due to a fill operation until a write back operation is performed;

a first write queue, said first write queue storing a write request for said second non-blocking cache until a write hit is achieved and the address needed to write into said second non-blocking cache is obtained;

a second cache controller, said second cache controller including an arbiter, said second cache controller for controllably prioritizing between said functional units requesting access to said second non-blocking cache;

a third non-blocking cache receiving access requests from said second miss queue, said third non-blocking cache being a multi-port write back cache including at least one read port and at least one write port;

a third miss queue storing entries corresponding to access requests not serviced by said third non-blocking cache;

a second victim queue, said second victim queue dedicated to storing entries that have been evicted from said third non-blocking cache due to a fill operation until a write back operation is performed;

a second write queue, said second write queue storing a write request for said third non-blocking cache until a write hit is achieved and the address needed to write into said third non-blocking cache is obtained; and a third cache controller, said third cache controller including an arbiter, said third cache controller for controllably prioritizing between said functional units requesting access to said third non-blocking cache.

2. The cache system of claim 1, wherein said first non-blocking cache is comprised of an instruction cache having a miss queue associated therewith, and a data cache having a miss queue associated therewith.

3. The cache system of claim 1, wherein said first non-blocking cache receives access requests from one or more integer pipelines of the processor.

4. The cache system of claim 1, wherein said second non-blocking cache is a unified cache.

5. The cache system of claim 1, wherein said second non-blocking cache receives access requests from one or more floating point pipelines in the processor.

6. The cache system of claim 1, wherein said third miss queue is coupled to generate access requests to a main memory of the processor.

7. The cache system of claim 1, wherein said third non-blocking cache is external to the processor.

8. A processor that executes coded instructions, comprising:

an instruction scheduling unit receiving the coded instructions and issuing received instructions for execution;

an instruction execution unit generating access requests a first non-blocking cache receiving access requests from in response to the issued in structions; devices in a processor, said first non-blocking cache being a multi-port write through cache including at least one read port and at least one write port;

a first miss queue dedicated to storing entries corresponding to access requests not serviced by said first non-blocking cache;

a first cache controller, said first cache controller including an arbiter, said first cache controller for controllably prioritizing between said devices requesting access to said first non-blocking cache;

a second non-blocking cache receiving requests from said first miss queue, said second non-blocking cache being a muti-port write back cache including at least one read port and at least one write port;

a second miss queue dedicated to storing entries corresponding to access requests not serviced by said second non-blocking cache;

a first victim queue, said first victim queue dedicated to storing entries that have been evicted from said second non-blocking cache due to a fill operation until a write back operation is performed;

a first write queue, said first write queue storing a write request for said second non-blocking cache until a write hit is achieved and the address needed to write into said second non-blocking cache is obtained;

a second cache controller, said second cache controller including an arbiter, said second cache controller for controllably prioritizing between said devices requesting access to said second non-blocking cache;

a third non-blocking cache receiving access requests from said second miss queue, said third non-blocking cache being a multi-port write back cache including at least one read port and at least one write port;

a third miss queue storing entries corresponding to access requests not serviced by said third non-blocking cache;

a second victim queue, said second victim queue dedicated to storing entries that have been evicted from said third non-blocking cache due to a fill operation until a write back operation is performed;

a second write queue, said second write queue storing a write request for said third non-blocking cache until a write hit is achieved and the address needed to write into said third non-blocking cache is obtained; and a third cache controller, said third cache controller including an arbiter, said third cache controller for controllably prioritizing between said devices requesting access to said third non-blocking cache.

9. The processor of claim 8, wherein said first non-blocking cache is comprised of an instruction cache having a miss queue associated therewith, and a data cache having a miss queue associated therewith.

10. The processor of claim 8, wherein said first non-blocking cache receives access requests from one or more integer pipelines of the processor.

11. The processor of claim 8, wherein said second non-blocking cache is a unified cache.

12. The processor of claim 8, wherein said second non-blocking cache receives access requests from one or more floating point pipelines in the processor.

13. The processor of claim 8, wherein said third miss queue is coupled to a main memory of the processor.

14. The processor of claim 8, wherein said third non-blocking cache is external to the processor.

15. A computer system comprising:

a processor formed on an integrated circuit chip;

a cache system coupled to said processor, the cache system further comprising:

a first non-blocking cache receiving access requests from devices in a processor, said first non-blocking cache being a multi-port write through cache including at least one read port and at least one write port;

a first miss queue dedicated to storing entries corresponding to access requests not serviced by said first non-blocking cache;

a first cache controller, said first cache controller including an arbiter, said first cache controller for controllably prioritizing between said devices requesting access to said first non-blocking cache;

a second non-blocking cache adapted to receive access requests from said first miss queue, said second non-blocking cache being a muti-port write back cache including at least one read port and at least one write port;

a second miss queue dedicated to storing entries corresponding to access requests not serviced by said second non-blocking cache;

a first victim queue, said first victim queue dedicated to storing entries that have been evicted from said second non-blocking cache due to a fill operation until a write back operation is performed;

a first write queue, said first write queue storing a write request for said second non-blocking cache until a write hit is achieved and the address needed to write into said second non-blocking cache is obtained;

a second cache controller, said second cache controller including an arbiter, said second cache controller for controllably prioritizing between said devices requesting access to said second non-blocking cache;

a third non-blocking cache receiving access requests from said second miss queue, said third non-blocking cache being a multi-port write back cache including at least one read port and at least one write port;

a third miss queue storing entries corresponding to access requests not serviced by said third non-blocking cache;

a second victim queue, said second victim queue dedicated to storing entries that have been evicted from said third non-blocking cache due to a fill operation until a write back operation is performed;

a second write queue, said second write queue storing a write request for said third non-blocking cache until a write hit is achieved and the address needed to write into said third non-blocking cache is obtained; and a third cache controller, said third cache controller including an arbiter, said third cache controller for controllably prioritizing between said devices requesting access to said third non-blocking cache.

16. The computer system of claim 15, wherein said first non-blocking cache is comprised of an instruction cache having a miss queue associated therewith, and a data cache having a miss queue associated therewith.

17. The computer system of claim 8, wherein said first non-blocking cache receives access requests from one or more integer pipelines in the processor.

18. The computer system of claim 15, wherein said second non-blocking cache is a unified cache.

19. The computer system of claim 15, wherein said second non-blocking cache receives access requests from one or more floating point pipelines in the processor.

20. The computer system of claim 15, wherein said third miss queue is coupled to a main memory of the processor.

21. The computer system of claim 15, wherein said third non-blocking cache is external to the processor.

* * * * *